United States Patent Office 3,101,991
Patented Aug. 27, 1963

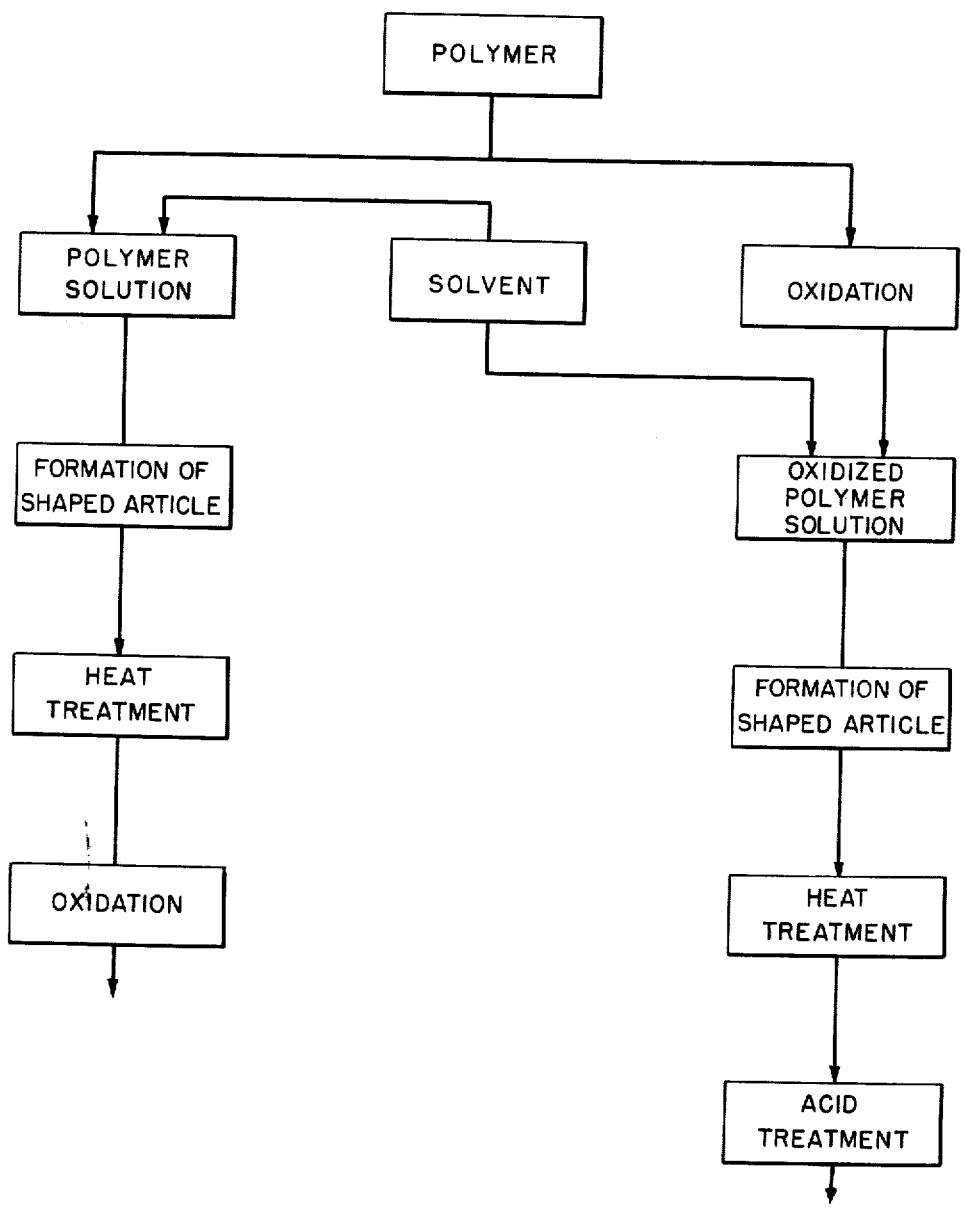

3,101,991
PRODUCTION OF POLYVINYL FORMAL
SHAPED ARTICLES
Osamu Fukushima, Hirotoshi Kurashige, and Kigen Kawai, Kurashiki City, Japan, assignors to Kurashiki Rayon Co., Ltd., Kurashiki-shi, Japan, a corporation of Japan
Filed Jan. 17, 1961, Ser. No. 83,136
Claims priority, application Japan Jan. 21, 1960
8 Claims. (Cl. 18—54)

This invention relates to the production of shaped articles formed from polyvinyl formal and polyvinyl formal derivatives, more particularly derivatives containing basic nitrogen.

Polyvinyl alcohol shaped articles such as filaments and films are produced by known methods. Usually such shaped articles show undesirable sensitivity to water, especially hot water. In order to improve the properties of such shaped articles, the articles are usually subjected to a heat treatment at temperatures in the range of 200–250° C. followed by acetalization.

Thus, polyvinyl alcohol fibers, known commercially as "vinylon," are produced by well-known procedures involving the spinning of the fibers from a solution or other liquefied form of the polymer. Because vinylon is a water-soluble high polymer, its conventional manufacturing process requires not only sufficient heat treatment after the spinning step to impart hot-water resistance, but also a subsequent acetalization with formaldehyde, benzaldehyde, and the like to make it insoluble.

The fact that vinylon requires such fiber processing steps causes increased manufacturing costs in spite of the relative inexpensiveness of the raw materials, and increases the chances of damage to the fibers with a tendency toward lowered uniformity of the finally treated fibers. It is well known that the elasticity of vinylon is enhanced when the polyvinyl alcohol fiber is acetalized with benzaldehyde after heat treatment, according to many studies made to date regarding the physical properties of contemporary vinylon. It is thought to be significant, however, that when dyeing properties are taken into consideration, a vinylon of a quality generally equal to that of benzalized vinylon is obtainable by treatment with formalin for the purpose of making the fiber insoluble, since benzaldehyde is a more expensive compound than formalin, and the acid resisting properties of the benzalization bond are very poor, thus restricting the uses of the goods produced. However, formalized vinylon is clearly inferior to benzalized vinylon with respect to elasticity, and this poor elasticity is thought to be one of the main factors preventing the development of formalized vinylon in the field of fibers for clothing today.

It is accordingly an object of the present invention to provide a process for producing shaped articles, e.g. fibers, films, tubes, and the like from formalized polyvinyl alcohol or its derivatives which have the advantages of formalized products previously studied yet avoid the drawbacks and deficiencies of such products.

It is a further object of the invention to provide a process for producing shaped articles of the character indicated which combine good elasticity with good hot-water resistance and dyeability.

It is another object of the invention to provide shaped articles based on formalized polyvinyl alcohol and its derivatives which exhibit the aforementioned combination of desirable properties.

Formalized polyvinyl alcohol, which is commonly referred to as polyvinyl formal, is a well-known substance in which formaldehyde is combined with polymeric vinyl alcohol. Polyvinyl formal is analogous to the alkylidene diethers, or acetals, formed when two molecules of a simple alcohol combine with one molecule of an aldehyde, and from this analogy the identifying term, polyvinyl acetal, is obtained. As in the case of the simple alcohols, polyvinyl alcohol combines with aldehydes in the proportion of two molecular equivalents of its theoretical monomer, vinyl alcohol, to each molecular equivalent of aldehyde.

It may be assumed that polyvinyl alcohol contains in each macromolecule a number of alcoholic hydroxyl groups directly proportional to its degree of polymerization. Each pair of these hydroxyl groups will combine with a formaldehyde radical, and the formation of polyvinyl formal is well known. Since polyvinyl alcohol is derived chiefly from polymerized vinyl esters, e.g. polyvinyl acetate, by hydrolysis or saponification, it has been proposed to make polyvinyl formal by treating the polymerized vinyl esters to remove the acyl radicals which are subsequently or concurrently replaced by formaldehyde groups to yield the formal.

In accordance with the present invention, polyvinyl formal or basic-nitrogen-containing formal, produced by treatment with formaldehyde of polyvinyl alcohol, or a copolymer composed predominantly of vinyl alcohol and containing basic nitrogen, or a copolymer composed predominantly of vinyl alcohol and containing radicals convertible into basic nitrogen, or by treating polyvinyl alcohol with formaldehyde, and simultaneously, or before or after such formalization introducing basic nitrogen by chemical reaction, is dissolved in a mixed solvent. The resultant solution is extruded into a coagulating bath, or into air at room temperature or at higher temperatures, to form fibers, film, rods, or other formed products.

The polyvinyl formal or polyvinyl formal basic-nitrogen-containing derivative is treated with an oxidizing agent which is effective to break or cleave the 1,2 glycol bond of the formalized polymer, the oxidizing agent being used under acidic conditions. Treatment with the oxidizer may be effected prior to extrusion, e.g. prior to the formation of the solution or it may be effected after the shaped body has been formed. When oxidation is effected prior to extrusion, the subsequently produced shaped body is treated with an acid. Advantageously, the shaped body is heat-treated following extrusion. In this case, the acid treatment is advantageously effected after such heat treatment.

In accordance with the present invention, a method has been provided for simultaneously solving the problems of simplifying the manufacturing process and improving the elasticity and other properties to eliminate the essential drawbacks of the formalized vinylon referred to above. This invention makes it possible to simplify, after spinning or extrusion, the heat-treatment ordinarily effected to impart hot-water resistance and to eliminate the acetalization treatment usually employed for the manufacture of vinylon. Accordingly, while the spinning or extrusion operation requires an installation for the recovery of solvent, the manufacturing cost is greatly decreased and at the same time the uniformity of the fiber, film or other shaped body is significantly improved.

Regarding physical properties, especially elasticity, of the shaped bodies obtained by the method of this invention, it has been found that whereas the elasticity of formalized vinylon is very poor, that of the shaped bodies composed primarily of polyvinyl formal produced by this invention is very good. Both products are copolymers of vinyl alcohol and divinyl formal, or copolymers containing a small amount of vinyl ester, and are similar to each other in chemical construction. The formalized vinylon produced conventionally is heat-treated after spinning to fully adjust the molecular orientation and crystallization, thereby giving it hot-water resistance, and it is then subjected to treatment for fibrous formalization. In this case, it is assumed that the formalization bond converges to the non-crystal portion of the fiber, and the crystallized portion exists as polyvinyl alcohol. Accordingly, when the structure of the fiber is investigated, the distribution of vinyl alcohol and divinyl formal is found to be very uneven. The fact that the crystalline part and the amorphous part which effect the physical properties of the fibers have uneven structures, and are obviously of different chemical construction, has an adverse effect on the various properties of the fibers in hot water.

However, by the method of this invention, spinning or extrusion is effected with a solution prepared by dissolving the copolymer of divinyl formal and vinyl alcohol in a mixed solvent, and it is found that the divinyl formal portion, and the vinyl alcohol portion, or the portion containing a small amount of vinyl ester, are very uniformly distributed with respect to chemical structure. Accordingly, it is seen that the hydrophobic property of the fibers is very uniform in comparison with formalized vinylon heretofore available.

In addition, the elasticity is definitely improved in the polyvinyl formal fibers and other shaped articles produced by the method of this invention in comparison with formalized vinylon, and the combination of high hot-water resistance, elasticity, and dyeability make the products of this invention outstandingly superior to the formalized products heretofore known, such as formalized vinylon.

The present invention is particularly concerned with polyvinyl formals or polyvinyl formal derivatives which contain both formal groups and free hydroxyl groups in their structure, more specifically those which have 30 to 70% of the hydroxyl groups converted to formal groups. Such formals are referred to as having a degree of formalization of 30 to 70% and are prepared by conventional methods, the degree of formalization being simply controlled by regulating the amount of formaldehyde employed. Typical methods employ a mineral acid, e.g. sulfuric acid, as catalyst. These so-called partial polyvinyl formals are stronger, less thermoplastic and less readily soluble in organic solvents than are the polyvinyl esters or complete polyvinyl formals. Partial polyvinyl formals also have better heat-resisting properties than other polyvinyl acetals.

Various solvents for polyvinyl formals, such as dioxane, glacial acetic acid, dimethylformamide, ethylenechloride, pyridine, and the like, have been proposed. However, such solvents are limited in their applicability and difficulty is experienced in commercial applications where it is desired to form solutions of various concentrations with polyvinyl formals of varying degrees of formalization, e.g. ranging from 30 to 70%. No solvent has heretofore been proposed which is effective for such universal use and which also forms solutions which are particularly suitable for forming fibers, films and like molded products and which can be readily handled in industrial operations.

In order to obtain a good spinning or extruding solution, it is necessary to use a mixed solvent wherein water is one component, and the other component is at least one water-soluble cyclic ether such as dioxane, tetrahydrofuran, trimethylene oxide, and the like, or the other component is at least one water-soluble monohydric alcohol.

Typical monohydric water-soluble alcohols suitable for use include methyl alcohol, t-butyl alcohol, propyl alcohol, isopropyl alcohol, and allyl alcohol, all of which are completely soluble in water.

In will be understood, of course, that the proportions between the polyvinyl formal and the mixed solvent to form the desired solution will be influenced in part by the degree of formalization of the particular polyvinyl formal, i.e. the amount of the formal portion and the amount of the vinyl alcohol portion in the polyvinyl formal or polyvinyl formal derivative, and in part by the conditions, e.g. temperature, pressure, and the like, under which solution is effected. Furthermore, the employment of a low proportion of the monohydric water-soluble alcohol is particularly advantageous from an industrial standpoint, and the proportions of water and alcohol will vary somewhat with the particular alcohol to be used. For example, in the case of a mixed solvent consisting of water and methanol, the following table shows the minimum amounts of methanol necessary to achieve the desired dissolution of polyvinyl formal of various degrees of formalization, all parts being by weight.

| Degree of Formalization, percent | Dissolving temperature | Methanol, parts | Water, parts |
| --- | --- | --- | --- |
| 40 | 70° C | 7 | 3 |
| 50 | 70° C | 7 | 3 |
| 60 | 70° C | 8 | 2 |
| 70 | 70° C | 8 | 2 |
| 50 | 120° C (under pressure) | 1.5 | 8.5 |
| 60 | do | 2 | 8 |

As seen from the foregoing table, the amount of methanol required for dissolution varies with the degree of formalization, and with the dissolving temperature. However, in the case of elevated temperatures, e.g. 120° C. (under sufficient pressure to prevent vaporization) the required amount of methanol relative to water can be lowered to 15–20%. Accordingly, with such a mixture it is possible to obtain a mixed solution of pure, i.e. nonacetalized, polyvinyl alcohol, and polyvinyl formal. Corresponding values are applicable to the other solvents suitably used in accordance with the present invention, as can be readily ascertained by routine test.

For example, when a mixed solvent composed of tetrahydrofuran and water is used, the optimum mixing ratio in relation to the degree of formalization is illustrated in the following table, all parts being by weight.

| Degree of Formalization, percent | Tetrahydrofuran, parts | Water, parts |
| --- | --- | --- |
| 25 | 10 | 4 to 20 |
| 30 | 10 | 4 to 18 |
| 35 | 10 | 4 to 15 |
| 40 | 10 | 3 to 10 |
| 45 | 10 | 2.5 to 10 |
| 50 | 10 | 2 to 8 |
| 55 | 10 | 1.5 to 8 |
| 60 | 10 | 1 to 5 |

While the optimum mixing ratio differs with each degree of formalization as shown in the table, when tetrahydrofuran is used, the amount of water may be varied in a comparatively wide range. However, this solvent has the peculiar property that when it is present outside the indicated range, coagulation of the polyvinyl formal or polyvinyl formal derivative occurs. This property is responsible for a very interesting phenomenon in spinning. In ordinary dry spinning, the fibers tend to adhere to one another after they are taken up unless at least 70% of the solvent is removed. However, when, for example, polyvinyl formal of a degree of formalization of 40% was dissolved in a mixed solvent made up of 10 parts of tetrahydrofuran and 8 parts of water and only 2 parts of tetrahydrofuran is removed, so that the mixing ratio of water increases, then the surface of the polyvinyl formal fiber begins to coagulate immediately, the spinnability of the thread does not degrade, and the adhesion among the fibers is not observed after they are taken up. By utilizing such a characteristic, and since a long spinning cell is not required for the taking up of spun yarn even if the spinning solution contains 70–80% of solvent, it is possible to employ a melt spinning process wherein fibers are spun by extruding them into air at room temperature, it is possible to use with water a smaller amount of the other solvent component, and to achieve a higher spinning capacity and a reduction in the installation cost.

The same factors apply when a water-alcohol mixed solvent is employed. Then, when polyvinyl formal having a degree of formalization of 55% is subjected to dry spinning after dissolving it in a mixed solvent consisting of 7 parts of methyl alcohol and 3 parts of water, and when only two parts of methanol are removed, the surfaces of the polyvinyl formal fibers are immediately subjected to coagulation. Furthermore, no deterioration in the drawing properties is caused and adhesion among the fibers after take-up is eliminated.

The heat-treatment of the fiber produced in accordance with the present invention, when employed, may be carried out in conventional manner, e.g. by means of a dry hot air bath, wet heat-treatment, molten metal bath treatment, and treatment in baths containing organic solvents, oils or salts. In accordance with the invention, either the original polyvinyl formal or derivative is treated with an oxidizer capable of breaking the 1,2 glycol bonds in the polyvinyl alcohol portion of the polymer before dissolving it in the mixed solvent and the ruptured bonds are cross-linked by acid treatment after spinning or heat-treatment of the polyvinyl formal fiber, film or other shaped article, or the shaped article, e.g. fiber, is treated after it has been formed, and preferably after it has been heat-treated, when heat-treatment is employed, with the oxidizer capable of breaking the 1,2 glycol bond, cross-linking being effective by carrying out the oxidation under acidic conditions. Any oxidizing agent effective to break the 1,2 glycol bond may be used, and typical oxidizers include periodic acid, periodic acid salts, including alkali metal salts, tetraacetic acid, lead tetraacetate, and other salts of tetraacetic acid, including alkali metal salts, and hydrogen peroxide together with pervanadic acid.

The acid resistance of the acetalization bond is generally a problem. In the case of the acid treatment with an oxidizer mentioned above, however, polyvinyl formal, different from polyvinyl benzal, is found to have excellent acid resistance. Because of this characteristic, no abnormality is observed in the treatment of polyvinyl formal or derivatives under acidic conditions.

It is generally preferred to carry out the oxidation by immersing the polyvinyl alcohol shaped article in an aqueous solution of the oxidizing agent. However, the oxidation can be carried out in organic solvent solutions of oxidizing agent or by using gaseous oxidizing agents. The oxidation can be carried out at normal or elevated temperatures, e.g. 0–100° C., for times ranging from a few minutes to several hours.

To make the oxidizing solution acid or to provide an acid solution for subsequent treatment, suitable acids are added, for example, mineral acids such as hydrochloric and sulfuric acids, or organic acids such as chloroacetic, formic or benzene sulfonic acid.

The temperature of the acid and/or oxidizing treatment may vary within wide limits. Usually room temperature is satisfactory, although temperatures up to 100° C. are also used. The time required for the acid treatment varies from about 30 minutes to one hour.

The physical properties of shaped products resulting from spinning, heat-treatment and oxidizer-treatment in accordance with the present invention are compared with those of formalized or benzalized vinylon in the following table, by way of example.

The polyvinyl alcohol suitable for use in forming the polyvinyl formal employed in preparing shaped products in accordance with the present invention includes polymers composed principally of the vinyl alcohol radical. Polyvinyl alcohol is a polymer containing hydroxyl groups and corresponding to the formula:

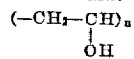

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

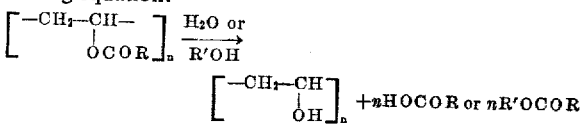

Typical polyvinyl alcohols which can be suitably used are described, for example, in Cline et al. U.S. Patent 2,636,803.

The polymeric solutions are spun to form fibers, for example, in conventional manner by extruding the solution through small holes in a spinning jet into a medium effective to remove water therefrom. In wet spinning processes the medium can, for example, be a concentrated aqueous solution of a coagulating salt such as sodium sulfate or ammonium sulfate, while in dry spinning techniques air or an inert gas such as nitrogen is employed. Suitable spinning conditions for producing fibers from the spinning solutions of this invention are described, for example, in U.S. Patent 2,642,333 as well as in Cline et al. U.S. Patent 2,636,803 and Osugi et al. U.S. Patent 2,906,594.

The fibers may suitably be stretched and heat treated in accordance with conventional techniques as illustrated, for example, in U.S. Patents 2,636,803, 2,636,804 and 2,906,594. Thus, the fibers are suitably stretched to a draw ratio of about 2:1 to 12:1 during or after spinning For wet spun filaments, the stretching can be carried out directly after spinning while the fibers are wet at room temperature up to 100° C. to a draw ratio of about 5:1. For stretching to higher draw ratios, it is preferred to conduct the stretching in a heated medium such as air at 100–250° C.

The heat treatment is usually carried out by heating the fibers in a medium such as air at 210–250° C. for 2 seconds to 5 minutes.

Formalization to form the formal is conveniently carried out in an aqueous solution containing 0.2–10% aldehyde, 5–20% sulfuric acid and 0–25% sodium sulfate or ammonium sulfate at temperatures of 40–80° C. for times ranging from a few minutes, e.g. 10 minutes, to several hours, e.g. 5 hours.

The polymers contained in the solutions of this invention are similarly formed into other shapes such as films by conventional techniques. Thus, films are suitably produced by the procedure described, for example, in Izard et al. U.S. 2,236,061 and in Herrmann et al. U.S. Patent 2,837,770.

The drawing is a single flow sheet illustrative of the invention.

TABLE A

| Type of fiber | Degree of acetalization (percent) | Strength, g./d. | Elongation (percent) | Degree of elastic recovery | | | Shrinkage in water at 110° C. (percent) |
|---|---|---|---|---|---|---|---|
| | | | | 1% | 3% | 5% | |
| Polyvinyl formal fiber in accordance with the present invention | 55 | 1.5–2.5 | 25–35 | 90–95 | 65–70 | 45–55 | 2–3 |
| Conventional formalized vinylon | 40 | 2.5–3.5 | 15–20 | 50–60 | 35–40 | 35–40 | 2–3 |
| Conventional benzalized vinylon | 30 | 2.0–3.0 | 15–20 | 90–95 | 65–75 | 40–50 | 3–4 |

The invention will be further understood from the following specific examples of practical application. However, it will be understood that these examples are not to be construed as limiting the scope of the present invention in any manner. In the examples, all parts are by weight unless otherwise indicated.

The conditions and the relative relationships set forth in the examples are those preferred in carrying out the process of this invention, but it will be understood that other conditions and relationships may be used within the scope of the invention. In general, unless otherwise indicated, conventional operations and techniques are suitably employed.

*Example 1*

An aqueous solution containing 4% of polyvinyl alcohol of a degree of polymerization of 1000, 0.6% of formaldehyde and 20% of sulfuric acid was caused to react at 60° C. for 90 minutes under agitation at the rate of 500 r.p.m. As the reaction progressed, white fine particles separated.

After the completion of reaction, the particles were separated by filtration, washed and dried in air at 60° C. for 20 hours. The fully dried powder particles were polyvinyl formal having a degree of formalization of 50%.

This polyvinyl formal was dissolved in a mixed solvent consisting of 7 parts of methyl alcohol and 3 parts of water at 70° C. under agitation for 3 hours, so that the resulting solution contained 20% polyvinyl formal. There was thus produced a spinning solution.

This spinning solution was projected into air at room temperature through a spinneret of 0.3 mm. diameter, the solution being at a temperature of 60° C. The yarn spun in this way could be taken up without mutual adhesion between the strands of fibers at a point 3 meters below the spinneret.

The fibers spun as described above were dried in air having a temperature of 60° C. for 3 hours. Following this drying, the fibers were drawn in a hot-air oven maintained at 210° C. The fibers were subsequently heat-set in another hot-air oven held at 210° C. Upon treating these fibers in an aqueous solution consisting of periodic acid (0.25%), sulfuric acid (15%) and ammonium sulfate (15%) at a temperature of 70° C. for 60 minutes, polyvinyl formal fibers having excellent elasticity and hot-water resistance were obtained.

By way of example, the dyeability of the fibers manufactured as described above is shown in the following table.

The amount of dyeing of the fiber is given as the amount of dye absorbed (mg.) per 1 g. of the fiber.

The conventional dyeing procedure involving a temperature of 80° C. for 60 minutes was employed.

| Direct dyes: | Dyeing amount, mg./g. |
|---|---|
| Nippon Fast Violet 2B (4% based on the weight of fiber) | 35 |
| Direct Blue 2B (4% based on the weight of fiber) | 30 |
| Direct Green (4% based on the weight of fiber) | 39.5 |

*Example 2*

An aqueous solution containing 4% of polyvinyl alcohol of a degree of polymerization of 1000, 0.7% of formaldehyde, and 20% of sulfuric acid was caused to react at 60° C. for 90 minutes under agitation at the rate of 200 r.p.m. As the reaction progressed, white, fine particles separated.

After the completion of reaction, the particles were filtered off and thoroughly washed. The thus obtained powder was then treated in an aqueous solution consisting of 0.5% periodic acid at 60° C. for 30 minutes. After this treatment, the powder was again filtered, water-washed, and dried. This powder was polyvinyl formal having a degree of formalization of 55%.

This polyvinyl formal was dissolved in a mixed solvent comprising 7.5 parts of methyl alcohol and 2.5 parts of water at 70° C. under agitation for 3 hours to produce a spinning solution containing 25% of polyvinyl formal.

This spinning solution was projected into a spinning cell held at 100° C. through a spinneret of 0.3 mm. diameter, the solution being at a temperature of 70° C. No mutual adhesion between the strands of fibers was observed at a point 4 meters below the spinneret. The yarn spun was subsequently drawn by 500% through heat-rollers arranged in succession and taken up in conventional manner.

The yarn spun and drawn as described above was treated in an acidic bath comprising 10% sulfuric acid and 15% ammonium sulfate at a temperature of 60° C. for 60 minutes. The fiber resulting from this treatment was a polyvinyl formal fiber endowed with satisfactory hot-water resistibility, dyeability similar to that of the fiber of Example 1, and good elastic properties.

*Example 3*

An aqueous solution consisting of 4% of polyvinyl alcohol of a degree of polymerization of 1200, 0.7% of formaldehyde, and 35% of sulfuric acid, was caused to react at a temperature of 60° C. for 90 minutes under agitation at the rate of 500 r.p.m. After this reaction, an equal amount of an aqueous solution containing 1% of a surface active agent was gradually added to the aforesaid solution. A precipitate of polyvinyl formal separated. The precipitate of polyvinyl formal was separated by filtration, thoroughly washed, and dried in air at 60° C. for 20 hours. The resulting dried powder was polyvinyl formal having a degree of formalization of 60%.

This polyvinyl formal was dissolved in a mixed solvent comprising 8 parts of isopropyl alcohol and two parts of water at 95° C. under agitation for 3 hours to form a spinning solution containing polyvinyl formal in a concentration of 35%.

This spinning solution was projected into a spinning cell kept at 120° C. through a spinneret of 0.3 mm. diameter. The yarn was coagulated and dried and was taken up without any mutual adhesion between the fiber strands being observed at a point 5 meters below the mouthpiece.

The yarn spun in this way was drawn by 400% in a hot air oven maintained at 210° C. By treating the yarn in an aqueous solution consisting of periodic acid (0.5%), sulfuric acid (10%), and ammonium sulfate (15%) at a temperature of 70° C. for 60 minutes, polyvinyl formal fibers of excellent elasticity and hot water resistance were obtained.

*Example 4*

A solution comprising 3% of polyvinyl alcohol of a degree of polymerization of 1000, 0.5% of formaldehyde, and 15% of sulfuric acid was caused to react at a temperature of 60° C. for 90 minutes under agitation at the rate of 200 r.p.m. In the course of the reaction, white particles separated.

After the completion of the reaction, the particles were separated by filtration, thoroughly washed and dried in air having a temperature of 60° C. for 20 hours. The fully dried powder thus obtained was polyvinyl formal having a degree of formalization of 45%. This polyvinyl formal was kneaded with a mixed solvent consisting of 6 parts of amyl alcohol and 4 parts of water to form a mixture with a concentration of polyvinyl formal of 60%. This mixture was dissolved by the use of an extruder and the resulting solution was projected into air at room temperature through a spinneret of 0.5 mm. diameter with the solution being at a temperature of 98° C. The coagulated yarn which formed was taken up without any mutual adhesion between fiber strands being observed at a point 1 meter below the spinneret. The yarn thus spun was drawn by 400% in a silicon oil bath kept at 200° C. The drawn yarn was then heat shrunk either in a silicone oil bath kept at 200° C. or in a saturated salt bath at a temperature of 140° C. for 1 hour. Subsequently, by treating the yarn in an aqueous solution comprising periodic acid (0.5%) and sulfuric acid (15%) at a temperature of 40° C. for 30 minutes, polyvinyl formal fibers of excellent elasticity, hot-water resistance and dyeability were obtained.

*Example 5*

An aqueous solution comprising 4% of polyvinyl alcohol of a degree of polymerization of 1000, 0.6% of formaldehyde, 0.25% of beta-cyclohexyl amino butyl aldehyde dimethyl acetal, 50% of sulfuric acid and 1% of a surface active agent was caused to react at a temperature of 60° C. for 90 minutes under agitation. After the completion of reaction, the particles of polyvinyl formal containing basic nitrogen were separated by adding an equal amount of water to the solution described above. The separated particles were washed, and dried in air having a temperature of 60° C. for 20 hours. The thus-obtained fully dried powder was a derivative of polyvinyl formal having a degree of formalization of 55% and a basic nitrogen content of 0.25 mol percent.

This derivative of polyvinyl formal was dissolved in a mixed solvent comprising 8 parts of ethyl alcohol and 2 parts of water at a temperature of 70° C. under agitation for 5 hours to produce a spinning solution having a 30% concentration of the derivative. By projecting this spinning solution into a spinning cell held at 80° C. through a spinneret of 0.3 mm. diameter, the coagulated yarn was taken up without any mutual adhesion between fiber strands being observed at a point five meters below the spinneret.

The yarn thus spun was drawn by 300% through heat-rollers directly coupled with the spinning operation. The drawn yarn was heat-set either in a silicone oil bath or in a heat-treating machine with air at a temperature of 210° C. for 60 seconds. Subsequently, by treating the yarn in an aqueous solution consisting of periodic acid (0.25%) and sulfuric acid (10%) at a temperature of 50° C. for 30 minutes, polyvinyl formal yarn of excellent elasticity, hot-water resistance and dyeability was obtained.

By way of example, the dyeability of the fibers produced in accordance with Example 5 is shown in the following table.

The amount of dyeing is indicated as the amount of dye absorbed (mg.) per g. of the sample.

Dyeing was effected at a temperature of 80° C. for 60 minutes by adopting the usual dyeing procedure.

| | Amount of dyeing, mg./g. |
|---|---|
| Direct dyes: | |
| Nippon Fast Violet BB (2% based on the weight of fiber) | 20.0 |
| Direct Blue 2B (2% based on the weight of fiber) | 19.8 |
| Acid dyes: | |
| Acid Brilliant Scarlet 3B (4% based on the weight of fiber) | 40 |
| Brilliant Milling Green HR (4% based on the weight of fiber) | 39.5 |
| Acid Mordants: | |
| Sunchromine Brown RH (4% based on the weight of fiber) | 39.5 |

*Example 6*

Polyvinyl formal powder containing basic nitrogen which was obtained by reaction under the same conditions as those described in Example 5 (degree of formalization of 55%, nitrogen content of 0.25 mol percent) was treated in an aqueous solution consisting of 0.3% periodic acid at a temperature of 50° C. for 30 minutes. The powder was then filtered, washed and dried. The powder was formed into a solution and was spun and heat-drawn by the procedures described in Example 5. Subsequently, the fiber was acid-treated in an acidic bath consisting of sulfuric acid (15%) and ammonium sulfate (15%) at a temperature of 60° C. for 60 minutes.

The polyvinyl formal fiber thus obtained was excellent in hot-water resistance, dyeability and elasticity, similar to the fiber of Example 5.

*Example 7*

An aqueous solution comprising 4% of polyvinyl alcohol of a degree of polymerization of 1000, 0.6% of formaldehyde, 15% of sulfuric acid and 1% of a surface active agent was reacted at 60° C. for 90 minutes under agitation. After the completion of reaction, the resulting white powder was filtered, washed and dried in hot air at 60° C. for 20 hours.

The fully dried powder thus obtained was polyvinyl formal having a degree of formalization of 50%. This sample was designated as (A).

An aqueous solution comprising 4% of polyvinyl alcohol of a degree of polymerization of 1000, 1.5% of formaldehyde, 3% of beta-cyclohexyl amino butyl aldehyde di-methyl acetal, 15% of sulfuric acid and 1.5% of a surface active agent was caused to react at 60° C. for 90 minutes under agitation. A white powder separated. This powder was filtered, washed, and dried in hot air at 60° C. for 20 hours. The fully dried powder thus obtained was a derivative of polyvinyl formal having a degree of formalization of 45% and a content of basic nitrogen of 2.0%. This sample was designated at (B).

A mixture of polyvinyl formal and of its derivative prepared by mixing 10 parts of (A) with 1 part of (B), was dissolved under agitation in a mixed solvent comprising 7 parts of methyl alcohol and 3 parts of water at 80° C. for 3 hours to form a spinning solution having a polymer concentration of 13%.

This spinning solution was projected either into an aqueous solution at 40° C. or into hot water having a temperature of 70° C. through a spinneret of 0.1 mm. diameter with the solution at a temperature of 70° C. After passing through the coagulation bath of 1.5 m. length, the fibers were cold-drawn by 250% between first rollers and second rollers without any mutual adhesion between strands of fibers. The fibers were then taken up and dried.

By treating the fibers thus spun in an aqueous solution of 0.3% periodic acid at a temperature of 60° C. for 20 minutes, and subsequently in an aqueous solution comprising sulfuric acid (15%) and ammonium sulfate (20%) at a temperature of 50° C. for 30 minutes, fibers of a derivative of polyvinyl formal having quite satisfactory dyeability comparable to that of the fibers described in Example 4 were obtained.

*Example 8*

There were mixed 450 g. of vinyl acetate and 10 g. of 5-ethyl-2-vinyl pyridine and 4.9 g. of benzoyl peroxide as a catalyst, and mass polymerization of the mixture was effected at a temperature of 60° C. After 48 hours, the copolymer produced was dissolved in methanol and reprecipitated in water. The copolymer was purified by boiling it in water and 350 g. of a copolymer product was thus obtained. This copolymer was dissolved in 3 liters of methanol and saponified by the use of a 2-N aqueous solution of sodium hydroxide. There were thus obtained 150 g. of a saponified compound having a basic nitrogen content of 0.2%.

An aqueous solution comprising 4% of the aforesaid copolymer, the main component of which was polyvinyl alcohol containing basic nitrogen, 1.0% of formaldehyde, 15% of sulfuric acid, and 1% of a surface active agent was reacted at a temperature of 60° C. for 90 minutes. After the completion of reaction the white powder produced was filtered, washed, and dried in hot air at 60° C. for 20 hours. The fully dried powder was a derivative of polyvinyl formal having a basic nitrogen amount of 0.2% and a degree of formalization of 50%. This derivative of polyvinyl formal was dissolved either in a mixed solvent consisting of 8 parts of isopropyl alcohol and 2 parts of water to form a spinning solution of a polymer concentration of 25% solution (A), or in a mixed solvent comprising 8 parts of isopropyl alcohol and 2 parts of water to form a spinning solution of a polymer concentration of 12% solution (B). Solution A at a temperature of 60° C. was projected into an air bath of 100° C. through a spinneret of 0.3 mm. diameter and taken up at a point 5 meters below the spinneret. Solution B was projected into water held at 25° C. through a spinneret of 0.2 mm. diameter and taken up after passing through 1 m. long coagulation bath with water. The polyvinyl formal fibers thus obtained were heat-treated and periodic acid-treated in the manner described in Example 2. The resulting fibers of derivatives of polyvinyl formal had excellent elasticity, hot-water resistance and dyeability comparable to the products of Example 5.

*Example 9*

Eighty grams of a copolymer of methyl vinyl ketone and vinyl acetate in which the ketone content was 5 mol percent was dissolved in 0.5 liter of methanol saturated with ammonia. To the resulting solution was added 1 g. Raney nickel and reaction effected at a temperature of 80° C. for 4 hours by feeding hydrogen contained in a 1-liter autoclave under a pressure of up to 4.2 atmospheres gage. The resultant product was precipitated with methanol and washed.

Formalization of the derivative of polyvinyl alcohol containing 0.3% basic nitrogen thus obtained was effected according to the procedure described in Example 2. After formalization, a solution of the polymer was spun, heat-treated and periodic acid-treated, and there were obtained polyvinyl formal fibers having good dyeability similar to that of the fibers described in Example 5.

*Example 10*

An aqueous solution containing 4% of polyvinyl alcohol of a degree of polymerization of 1000, 0.8% of formaldehyde, and 20% sulfuric acid was reacted at a temperature of 60° C. for 90 minutes under agitation of 500 r.p.m. Upon completion of the reaction, the particles of polyvinyl formal which had separated were removed by filtration, washed and dried. The fully dried powder thus obtained was a polyvinyl formal having a degree of formalization of 65%.

Upon dissolving this polyvinyl formal in a mixed solvent comprising 8 parts of methyl alcohol and 2 parts of water at a temperature of 70° C. with stirring for 3 hours in an amount to provide a 25% concentration of the polyvinyl formal, a solution of polyvinyl formal was obtained.

From this solution there was formed a film of polyvinyl formal at a temperature of 80° C.–110° C. using the conventional drum type film forming method.

Subsequently, by treating this film in an aqueous solution comprising periodic acid (0.5%), sulfuric acid (15%) and ammonium sulfate (15%) at a temperature of 60° C. for 40 minutes, a transparent film of polyvinyl formal of excellent elasticity and hot water resistance was obtained.

*Example 11*

An aqueous solution containing 4% of polyvinyl alcohol having a degree of polymerization of 1000, 0.6% of formaldehyde, and 20% of sulfuric acid, was reacted at 60° C. for 90 minutes under agitation of 500 r.p.m. per minute. Fine white particles separated out as the reaction proceeded.

After the reaction, the particles were filtered, washed, and dried for 20 hours in air kept at 60° C. The resultant dried powder was polyvinyl formal of a degree of formalization of 45%.

A 30% spinning solution was prepared by dissolving this polyvinyl formal at 70° C. for 3 hours in a mixed solvent made up of 10 parts of tetrahydrofuran and 10 parts of water.

This spinning solution was extruded at 60° C. into air at room temperature through a 0.3 mm. spinneret and the resultant yarn could be taken up without evidence of adhesion at a point 3 m. below the spinneret.

The spun fiber was dried in air at 60° C. for 3 hours, and was then drawn by 700% in an air furnace kept at 210° C. It was then heat-set in an air oven kept at 210° C. After that, it was subjected to treatment at 70° C. for 60 minutes in an aqueous solution made up of 0.25% of periodic acid, 15% of sulfuric acid, and 15% of ammonium sulfate, whereby polyvinyl formal fibers with excellent elasticity and hot-water resistance were obtained.

*Example 12*

An aqueous solution composed of 4% of polyvinyl alcohol of a degree of polymerization of 1200, 0.7% of formaldehyde, and 50% of sulfuric acid, was reacted at 60° C. for 90 minutes under agitation of 500 r.p.m. per minute. After the reaction was complete, an equal volume of a 1% aqueous solution of a surface active agent was slowly added to the solution to cause precipitation of polyvinyl formal. This precipitate was then filtered, washed, and dried for 20 hours in air at 60° C. The dried powder thus obtained was polyvinyl formal of a degree of formalization of 60%. A spinning solution of 35% polymer concentration was prepared by dissolving at 95° C. for 3 hours under agitation this polyvinyl formal in a mixed solvent composed of 10 parts of dioxane and 6 parts of water.

This spinning solution was extruded at 95° C. into a spinning cell at 120° C. through a 0.5 mm. spinneret, and the resultant yarn when set and dried was then taken up without evidence of adhesion at a point 5 m. below the spinneret.

The yarn thus spun was subsequently drawn by 400% in an air oven at 210° C., and then treated at 70° C. for 60 minutes in an aqueous solution made up of 0.5% periodic acid, 10% of sulfuric acid, and 15% of ammonium sulfate, whereby polyvinyl formal fibers with excellent elasticity and hot-water resistance were obtained.

*Example 13*

An aqueous solution consisting of 3% of polyvinyl alcohol of a degree of polymerization of 1000, 0.5% of formaldehyde, and 15% of sulfuric acid was reacted at 60° C. for 90 minutes under agitation of 500 r.p.m. per minute. A white precipitate separated out as the reaction proceeded.

After completion of the reaction, this precipitate was thoroughly filtered, washed, and dried for 20 hours in air at 60° C. The dried powder thus obtained was polyvinyl formal of a degree of formalization of 40%.

This polyvinyl formal was kneaded with a mixed solvent composed of 10 parts of dioxane and 15 parts of water to provide a 70% polymer concentration, the mixture was melted in an extruder, and then spun at 98° C. into air through a 0.5 mm. spinneret. Subsequently, the yarn set and without adhesion was taken up at a point 1 m. below the spinneret.

The yarn thus spun was then drawn by 400% in a silicone oil bath at 200° C., and was either set with shrinkage in a silicone oil bath at 200° C., or was set with shrinkage at 140° C. for 1 hour in a saturated salt solution. After that, the yarn was treated at 40° C. for 30 minutes in an aqueous solution containing 0.5% of periodic acid and 15% of sulfuric acid, whereby polyvinyl formal fibers with excellent elasticity and hot-water resistance were obtained.

*Example 14*

An aqueous solution of 4% of polyvinyl alcohol (degree of polymerization: 1000), 0.6% of formaldehyde, 0.25% of beta-cyclohexylamino butylaldehyde dimethylacetal, 50% of sulfuric acid and 1% of a surface active agent was reacted at 60° C. for 90 minutes under agitation. After completion of the reaction, a precipitate of polyvinyl formal containing basic nitrogen was separated out by adding an equal volume of water to the solution. This precipitate was filtered, washed, and dried in air at 60° C. for 20 hours. The dried powder thus obtained was a derivative of polyvinyl formal containing 1.25 mol percent of basic nitrogen.

A 30% spinning solution was prepared by dissolving this polyvinyl formal derivative under agitation at 70° C. for 5 hours in a mixed solvent consisting of 10 parts of tetrahydrofuran and 8 parts of water. This spinning solution was spun at 60° C. through a 0.3 mm. spinneret into a spinning cell at 80° C., and the yarn after it had set and dried was taken up at a point 5 m. below the spinneret with no evidence of adhesion among the fiber strands.

The yarn thus spun was directly fed to a heating roller at 200° C., where it was drawn by 300%; it was heat-set at 210° C. for 60 seconds in silicone oil or in an apparatus for heat treatment with air, and was then treated at 50° C. for 30 minutes in an aqueous solution containing 0.25% of periodic acid and 10% of sulfuric acid, whereby polyvinyl formal fibers of excellent elasticity, hot-water resistance and dyeing properties were obtained.

The dyeing properties of the fibers produced by the method of this example are set forth in the following table.

The amount of dye absorbed by the fiber is shown as the amount of dye absorption (mg.).

Dyeing was carried out by the conventional method at 80° C. for 60 minutes in every case.

Direct dye: Amount of dye absorption, mg./g.
Nippon Fast Violet BB (2% of fiber) _____ 20.0
Direct Blue 2B (2% of fiber) _____ 19.8

Acid dye:
Acid Brilliant Scarlet 3R (4% of fiber) _____ 40
Brilliant Milling Green HR (4% of fiber) ____ 39.5

Acid mordant dye:
Sunchromine Brown RH (4% of fiber) _____ 39.5

*Example 15*

An aqueous solution containing 4% of polyvinyl alcohol of a degree of polymerization of 1000, 0.6% of formaldehyde, 15% of sulfuric acid, and 1% of a surface active agent was reacted at 60° C. for 90 minutes under agitation. After completion of the reaction, the white precipitate obtained was filtered, washed, and dried for 20 hours in air at 60° C. The dried powder recovered was polyvinyl formal of a degree of formalization of 45% (product A).

An aqueous solution containing 4% of polyvinyl alcohol (degree of polymerization: 1000), 1.5% of formaldehyde, 3% of beta-cyclohexylamino butylaldehyde dimethylacetal, 15% of sulfuric acid, and 1.5% of a surface active agent was reacted at 60° C. for 90 minutes under agitation, and a white precipitate separated out. This precipitate was filtered, washed, and dried for 20 hours in air at 60° C. The dried powder thus obtained was a polyvinyl formal derivative of a degree of formalization of 45% and containing 2.0% of basic nitrogen (product B).

A spinning solution was prepared by dissolving under agitation at 100° C. for 3 hours a mixture of the polyvinyl formal and the polyvinyl formal derivative obtained by mixing 10 parts of compound A referred to above with 1 part of compound B, to form a 13% solution.

This spinning solution was spun at 70° C. into an aqueous solution at 40° C. or into hot water at 70° C. through a 0.1 mm. spinneret, and after passing 1.5 m. through the coagulation bath, was cold-drawn by 250% between first and second rollers, and was then taken up and dried without any difficulty with respect to fiber adhesion.

The fibers thus obtained were heat-set at 160° C. for 30 minutes in silicone oil, or were heat-set at 170° C. for 30 seconds in air, and were then treated at 50° C. for 30 minutes in an aqueous solution containing 1% of tetraacetyl lead and 5% of sulfuric acid, whereby fibers of polyvinyl formal derivative having excellent dyeing properties were obtained as in the case of Example 14.

*Example 16*

Bulk polymerization was effected by mixing 450 g. of vinylacetate and 10 g. of 5-ethyl-2-vinylpyridine, and adding 4.9 g. of benzoylperoxide. 48 hours later, the copolymer was dissolved in methanol, reprecipitated in water, and was purified in water by boiling. A quantity of 330 g. of copolymer was thus obtained.

This copolymer was dissolved in 3 liters of methanol, and was saponified, using a 2-N aqueous potassium hydroxide, and 150 g. of the saponified product was obtained. The amount of basic nitrogen contained in this saponified product was 0.2%.

An aqueous solution having as its principal component the polyvinyl alcohol containing basic nitrogen obtained above and containing 1.0% of formaldehyde, 15% of sulfuric acid, and 1% of a surface active agent, was reacted at 60° C. for 90 minutes.

The white powder-like precipitate of the reaction was filtered, washed, and dried for 20 hours in air. The dried powder was a polyvinyl formal derivative of a degree of formalization of 50% and containing 0.2% of basic nitrogen. This polyvinyl formal derivative was mixed either with a mixed solvent composed of 10 parts of tetrahydrofuran and 8 parts of water to form a 25% solution (spinning solution A), or with a mixed solvent composed of 10 parts of dioxane and 6 parts of water to form a 12% solution (spinning solution B).

Spinning solution A was spun at 60° C. into air through a 0.3 mm. spinneret, and the fibers were taken up at a point 5 m. below the spinneret. Solution B was spun at 80° C. into water through a 0.2 mm. spinneret. The spun fibers were taken up after passing them through a coagulation bath 1 m. in length. The polyvinyl formal fibers obtained were subjected to heat treatment and to treatment with periodic acid by the method described in Example 12. The fibers of polyvinyl formal derivatives finally obtained showed very good elasticity, hot-water resistance, and dyeing properties just as the fibers of Example 14.

*Example 17*

Eighty grams of a copolymer of vinylacetate containing 5 mol percent of methyl-vinylketone was dissolved in 0.5 liter of methanol saturated with ammonia, to which 1 g. of Raney nickel was added. The solution was placed in an autoclave where hydrogen was pressed in to create a pressure of up to 4.2 atm. The reaction was carried out at 80° C. for 4 hours. The product was precipitated with methanol, and was washed.

A polyvinyl formal fiber of excellent dyeing properties comparable to those exemplified by the fiber of Example 14 was obtained by subjecting the polyvinyl alcohol derivative containing 0.3% of basic nitrogen obtained by the procedure described above to heat treatment and to treatment with periodic acid after formalization and spinning as described in Example 12.

*Example 18*

An aqueous solution containing 4% of polyvinyl alcohol (degree of polymerization: 1000), 0.8% of formaldehyde, and 20% of sulfuric acid was reacted at 60° C. for 90 minutes under agitation. The polyvinyl formal obtained after the reaction was thoroughly washed and dried. The degree of acetalization of this polyvinyl formal was 60%. This polyvinyl formal was then dissolved in a mixed solvent composed of 8 parts of tetrahydrofuran and 2 parts of water at 70° C. for 3 hours under agitation, to form a 25% solution. The polyvinyl formal solution obtained in this way was formed into a film at 80° C.–100° C. by the conventional drum film forming method, whereby a transparent film of polyvinyl formal was obtained. This film was then treated at 70° C. for 40 minutes in an aqueous solution containing 0.5% of periodic acid, 15% of sulfuric acid, and 15% of ammonium sulfate, and the resultant film of polyvinyl formal was found to have excellent elasticity, hot-water resistance, and dyeing properties.

In the foregoing examples, reference is made to the use of a surface-active agent. In general, various known types of anionic, non-ionic, and cationic surface-active agents or dispersants are suitably used, but it is preferred to use a non-ionic surface-active agent such as polyoxyethylenedodecyl ether, or a cationic surface-active agent such as dodecyltrimethylammonium chloride. In the examples, for instance, the surface-active agent is suitably polyoxyethylenedodecyl ether.

As will be apparent from the foregoing, polyvinyl formal when treated in accordance with the present invention produces shaped products of desirable characteristics, including the previously-mentioned combination of hot-water resistance, elasticity and dyeability particularly with respect to direct dyes. However, when greater dyeing properties are desired, particularly with respect to acid dyes and acid mordant dyes, then it is preferred to employ polyvinyl formal containing basic nitrogen or mixtures of polyvinyl formal and a basic-nitrogen-containing polyvinyl formal. Such polyvinyl formal derivatives, like polyvinyl formal itself, are readily prepared by known methods and their formation is exemplified in the foregoing examples.

Additional examples of the preparation of these nitrogen-containing polyvinyl formal derivatives, are given in the co-pending application of Matsubayashi and Fukushima Serial No. 42,998, filed July 15, 1960. Thus, copolymers of a vinyl ester and a vinyl monomer containing basic nitrogen, or a vinyl monomer containing radicals convertible to the basic nitrogen, are formalized during saponification, or are formalized after saponification. In another method, acetalization or etherification using aldehydes, epoxy compounds, ethyleneimine, or their derivatives, containing basic nitrogen, is effected simultaneously with or before or after the formalization of polyvinyl alcohol. In still another method, acetalization or etherification with aldehydes or epoxy compounds containing radicals convertible to basic nitrogen is carried out simultaneously with or before or after the formalization of polyvinyl alcohol, and then basic nitrogen is introduced by chemical reaction. Advantageously, 0.05% to 1.0% of basic nitrogen is introduced into the molecule. In this manner it is possible to obtain a polyvinyl formal product possessing good dyeing properties not only for direct dyes but also for acid dyes, acid mordant dyes, and the like.

Monomers containing basic nitrogen for copolymerization with a vinyl ester include 2-vinyl pyridine, 4-vinyl pyridine, 2-methyl-5-vinyl pyridine, vinyl quinoline, allylamine, beta-diethylaminoethylmethacrylate, 2-methyl-5-vinylpyridinium ethylbromide, allylpyridinium chloride, and the like. Similarly, monomers containing radicals readily convertible to basic nitrogen for copolymerization with a vinyl ester include allylchloride, allylbromide, N-vinylphthalimide, methylvinylketone, acrolein, acrylonitrile, and the like.

Aldehydes containing basic nitrogen which are suitably used to introduce basic nitrogen may be aldehydes having primary, secondary, or tertiary amino radicals such as aminoacetaldehyde, methylaminoacetaldehyde, butylaminoacetaldehyde, nonylaminoacetaldehyde, dodecylaminoacetaldehyde, dimethylaminoacetaldehyde, beta-aminopropionaldehyde, beta-dimethylaminopropionaldehyde, beta-cyclohexylaminobutylaldehyde, beta-diethylaminopyralaldehyde, pyridinaldehyde, and the like, or their acetals; or aldehydes or their acetals containing quarternary nitrogen obtained by the action of alkylating agents such as methyliodide, ethylbromide, allylchloride, and the like. The epoxy compounds containing basic nitrogen which may also be used include 1-dimethylamino-2,3-epoxypropane, 1-diethylamino-2,3-epoxypropane, 1-dibutylamino-2,3-epoxypropane, and the like, obtained from epichlorhydrin and secondary amines.

Aldehydes and epoxy compounds containing radicals easily convertible to basic nitrogen include chloroacetaldehyde, beta-bromopropionaldehyde, beta-chlorobutylaldehyde, beta-cyanopropionaldehyde, and salicylaldehyde, or their acetals, and epichlorhydrin, and the like.

The reactions wich may be employed for introducing basic nitrogen include the saponification of the acid amide radicals, the reaction of ammonia or of an amine on halogenides, the amidoximation by hydroxylamine of cyano-radicals, the reduction of carbonyl groups in the presence of ammonia, Strecker's reaction by means of ammonia, or an amine and inorganic cyanide compound, and like known reactions.

When mixtures of polyvinyl formal and polyvinyl formal containing basic nitrogen are employed, the relative amounts of the two polymers may vary but suitably they are used in in the ratio of 10:1 to 1:1 based on the weight of the polymers.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. A process for producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation in a single step with an oxidizing agent effective to oxidize the 1,2 glycol bonds in said polymer, said oxidizing agent being selected from the group consisting of periodic acid, periodic acid salts, tetraacetic acid, tetraacetic acid salts, hydrogen peroxide and pervanadic acid.

2. A process of producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation with an oxidizing agent effective to oxidize the 1,2 glycol bonds in said polymer, said oxidation being effected upon the polymer prior to extrusion, and said oxidizing agent being selected from the group consisting of periodic acid, periodic acid salts, tetraacetic acid, tetraacetic acid salts, hydrogen peroxide and pervanadic acid.

3. A process for producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation with an oxidizing agent effective to oxidize the 1,2 glycol bonds in said polymer, said oxidation being effected upon the shaped polymer article after extrusion, and said oxidizing agent being selected from the group consisting of periodic acid, periodic acid salts, tetraacetic acid, tetraacetic acid salts, hydrogen peroxide and pervanadic acid.

4. A process of producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation with an oxidizing agent effective to oxidize the 1,2 glycol bonds in said polymer, and said polymer being treated under acidic conditions to cross-link the bonds, and said oxidizing agent being selected from the group consisting of periodic acid, periodic acid salts, tetraacetic acid, tetraacetic acid salts, hydrogen peroxide and pervanadic acid.

5. A process for producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation in a single oxidation step with an oxidizing agent effective to oxidize the 1,2 glycol bonds in said polymer, said polymer having a 30 to 70% degree of formalization, and said oxidizing agent being selected from the group consisting of periodic acid, periodic acid salts, tetraacetic acid, tetraacetic acid salts, hydrogen peroxide and pervanadic acid.

6. A process of producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation with an oxidizing agent effective to oxidize the 1,2 glycol bonds in said polymer, said oxidation being effected upon the polymer prior to extrusion, said polymer having a 30 to 70% degree of formalization, and said oxidizing agent being selected from the group consisting of periodic acid, periodic acid salts, tetraacetic acid, tetraacetic acid salts, hydrogen peroxide and pervanadic acid.

7. A process for producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation with an oxidizing agent effective to oxidize the 1,2 glycol bonds in said polymer, said oxidation being effected upon the shaped polymer article after extrusion, said polymer having a 30 to 70% degree of formalization, and said oxidizing agent being selected from the group consisting of periodic acid, periodic acid salts, tetraacetic acid, tetraacetic acid salts, hydrogen peroxide and pervanadic acid.

8. A process of producing shaped articles of improved characteristics from polyvinyl formal which comprises extruding a solution of at least one polymer selected from the group consisting of polyvinyl formal and derivatives thereof containing basic nitrogen, said solution being a solution of said polymer in a mixture of water and at least one member of the group consisting of a water-soluble cyclic ether and a water-soluble monohydric alcohol, and subjecting said polymer to oxidation with an oxidizing agent effective to oxidize the 1,2 glycol bonds in said polymer, and said polymer being treated under acidic conditions to cross-link the bonds, said polymer having a 30 to 70% degree of formalization, and said oxidizing agent being selected from the group consisting of periodic acid, periodic acid salts, tetraacetic acid, tetraacetic acid salts, hydrogen peroxide and pervanadic acid.

References Cited in the file of this patent
UNITED STATES PATENTS
2,890,927    Sayama _____ June 16, 1959

OTHER REFERENCES

Textbook of Polymer Chemistry, Billmeyer, Interscience Publishers Inc., N.Y., 1957.

UNITED STATES PATENT OFFICE
CERTIFICATE OF CORRECTION

Patent No. 3,101,991                                August 27, 1963

Osamu Fukushima et al.

It is hereby certified that error appears in the above numbered patent requiring correction and that the said Letters Patent should read as corrected below.

Column 3, line 69, for "In" read -- It --; column 4, lines 2 and 3, for "empolyment" read -- employment --; column 6, line 41, after "spinning" insert a period; column 16, line 40, after "single" insert -- oxidation --.

Signed and sealed this 25th day of February 1964.

(SEAL)
Attest:
ERNEST W. SWIDER                          EDWIN L. REYNOLDS

Attesting Officer                      Acting Commissioner of Patents